United States Patent [19]
Oligschlaeger

[11] 3,877,645
[45] Apr. 15, 1975

[54] APPARATUS FOR SPRAYING LIQUID PRODUCT

[75] Inventor: Frederick F. Oligschlaeger, Rockford, Ill.

[73] Assignee: Dickey-John Corporation, Auburn, Ill.

[22] Filed: May 28, 1974

[21] Appl. No.: 473,395

[52] U.S. Cl. .............................................. 239/155
[51] Int. Cl. ............................................. B05b 9/06
[58] Field of Search ......... 239/67, 69, 155, 74, 178, 239/164, 365; 222/31, 178

[56] References Cited
UNITED STATES PATENTS

| | | | |
|---|---|---|---|
| 3,233,832 | 2/1966 | Hallberg | 239/155 |
| 3,344,993 | 10/1967 | Wilder et al. | 239/305 |
| 3,587,971 | 6/1971 | Ross | 239/155 |
| 3,707,305 | 12/1972 | de Kinkelder | 239/155 |

*Primary Examiner*—Lloyd L. King
*Attorney, Agent, or Firm*—Olson, Trexler, Wolters, Bushnell & Fosse, Ltd.

[57] ABSTRACT

A liquid distributor apparatus for use on a vehicle including a liquid product supply tank and a pump for pumping liquid from the tank to a spray bar system for spraying liquid product in a preselected width of the spread along a path traversed by the vehicle. The rate of flow of liquid product through the nozzles on the spray bar system varies as a function of the square root of the pressure drop across the nozzle and a control system is provided to sense the pressure in the spray bar system and the vehicle speed and to control flow of product to the spray bar system to vary the pressure on the product in the spray bar system as a function of the square of the speed of the vehicle to thereby maintain a preset spread density independent of variations in the speed of the vehicle.

18 Claims, 9 Drawing Figures

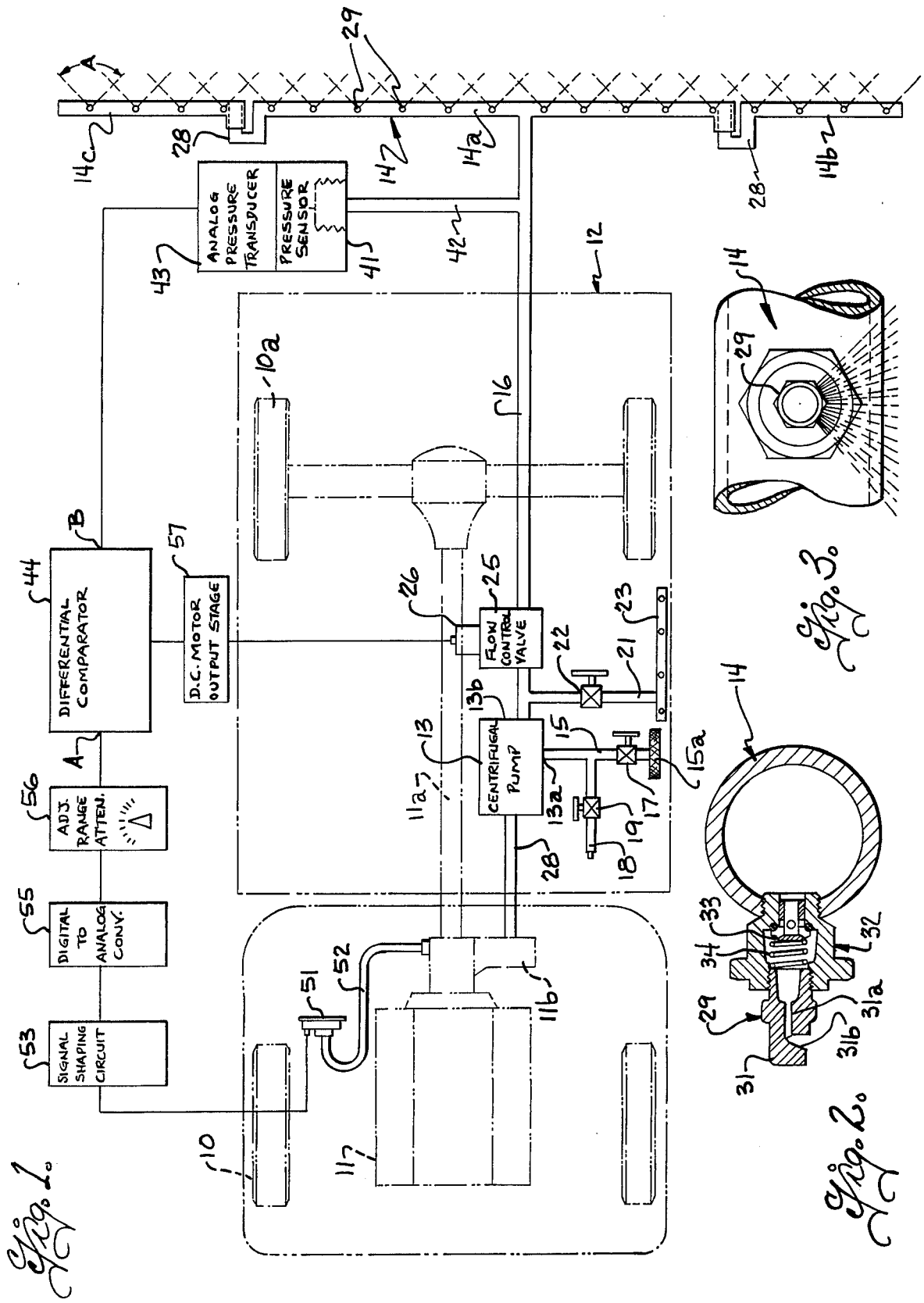

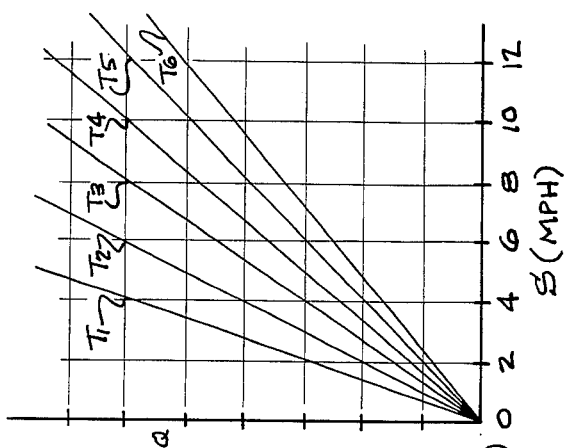
Fig. 7b.
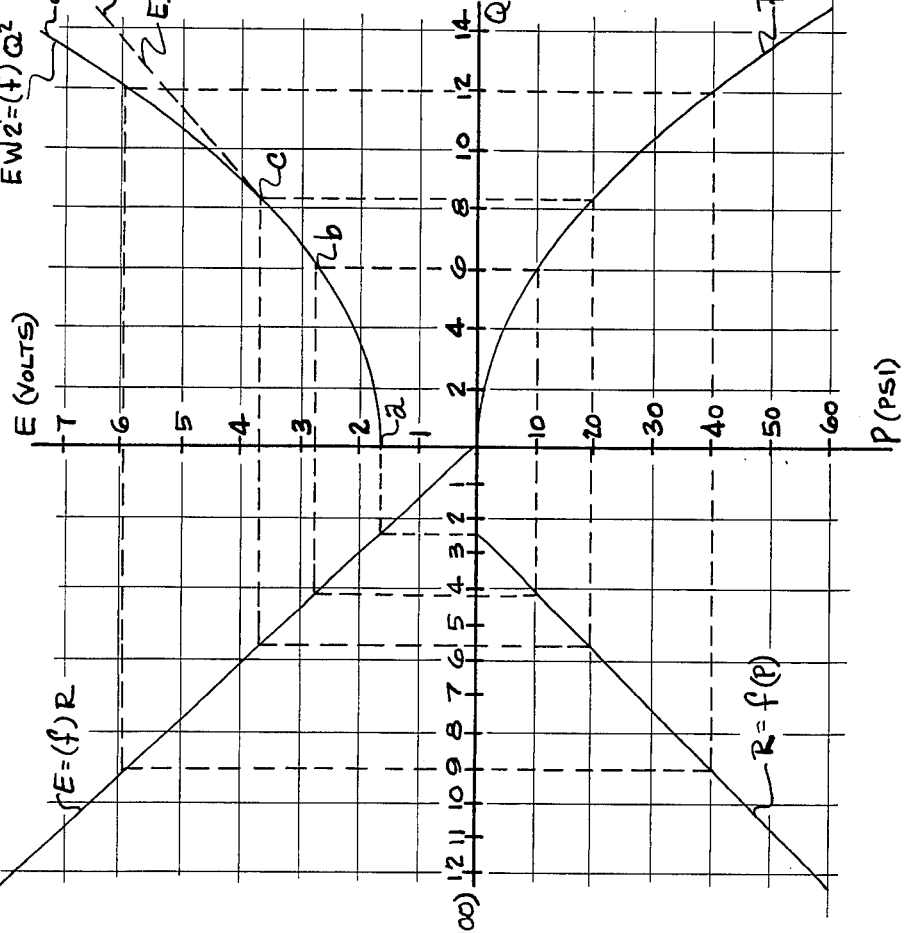
Fig. 7a.
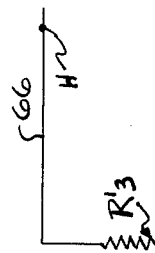
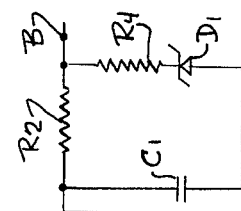
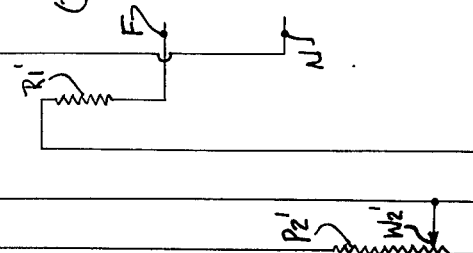
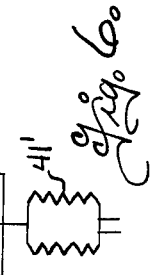
Fig. 6.

APPARATUS FOR SPRAYING LIQUID PRODUCT

BACKGROUND OF THE INVENTION

In the spreading of liquid product from a vehicle mounted spreader apparatus of the type having a spray bar system and a pump for pumping liquid product to the spray bar system, it is heretofore been the general practice to manually preset either the pump speed or the spray bar pressure in accordance with the settings indicated on a chart for preselected spread density at a fixed vehicle speed, and to then operate the vehicle at that fixed speed. However, it is not always convenient or possible, due to various factors including conditions of the terrain or road, the necessity of turning, obstacles, driver error, etc., to maintain a precise vehicle speed during the spreading operation so that variations in spread density can and do occur with such an arrangement due to changes in vehicle speed. In order to maintain a more uniform spread density at varying vehicle speeds, it is heretofore been proposed, as disclosed in the U.S. Patent to Wilder et al., No. 3,344,993, dated Oct. 3, 1967 and assigned to the assignee of the present invention, to vary the speed of the product pump with the vehicle speed and to adjust the ratio to be maintained between the speed of the product pump and the vehicle speed to vary the density of spread. However, the pressure required to force a liquid product through a spray bar having fixed orifice spray nozzles varies as the square of the rate of flow through the spray nozzles and fixed orifice spray nozzles generally operate to spray liquid uniformly over the spread width only in a preselected pressure range. At very low nozzle pressures, the liquid tends to merely run out of the spray nozzles and does not spread in a generally uniform spray pattern along the length of the spray bar. At high pressures, the liquid product is discharged from the nozzle at a high velocity and tends to splash and atomize as it is discharged onto the surface to be covered. Moreover, the varying pressure required to force the liquid product through fixed orifice spray nozzles causes varying slip in the product pump, accordingly, measuring the product pump speed as in U.S. Pat. No. 3,344,993, does not give a reliable measure of the rate of flow of product to the spray bar system at widely varying spray bar pressures. In the U.S. Pat. to J. Herman No. 3,782,634 dated Jan. 1, 1974, the rate of flow and pressure on the liquid product supplied to the spray bar system was varied under the control of a vehicle speed sensor and a positive displacement product flow meter which senses the flow of liquid product from the pump to the spray bar system, to vary the rate of flow of liquid product to the spray bar system with vehicle speed and maintain a preset selectively adjustable spread density over a wide range of vehicle speeds. The positive displacement flow meter interposed between the pump and the spray bar system does operate to measure the rate of flow of product to the spray bar system independent of the pressure variations at the spray bar system. However, positive displacement flow meters having the desired accuracy and capable of handling the relatively large volumes of liquid product sometimes dispensed through the spray bar system, are relatively expensive. Moreover, the liquid products dispensed are frequently of a corrosive nature and, moreover, may contain suspended solid particles so that the liquid product may corrode or otherwise contaminate a positive displacement flow meter.

SUMMARY OF THE INVENTION

The present invention relates to a vehicle mounted liquid distributing apparatus of the type in which liquid product is pumped from a tank to a spray bar system and the flow of liquid product to the spray bar system is varied in accordance with the speed of the vehicle over the ground to maintain a generally uniform preset spread density with varying vehicle speeds. The disadvantages of the higher ground speed control liquid distributing apparatus are overcome by the present invention in which the pressure on the product in the spray bar system is measured and the flow of product to the spray bar system is varied to adjust the pressure as a function of ground speed in a manner to maintain a generally uniform spread density at varying vehicle speeds.

Accordingly, the present invention provides a vehicle mounted liquid distributor apparatus of the type in which liquid product is pumped from a tank to a spray bar system having nozzles operative over a range of pressures to spray liquid product generally uniformly across a preselected width of spread at a time rate of flow that varies as a function of the square root of the pressure drop across the nozzles, and the apparatus includes a device for sensing the pressure on the liquid product in the spray bar, means for producing a first electrical control signal correlative with the pressure on the liquid product in the spray bar, vehicle speed sensing means for producing a second electrical control signal correlative with the speed of the vehicle, and a control means responsive to the first and second electrical control signals for controlling the rate of flow of product to the spray bar to vary the pressure on the product generally as a function of the square of the speed on the vehicle to thereby maintain a preset spread density. Preferably, the electrical control signal correlative with pressure is arranged to vary as a function of the square root of the pressure so as to thereby vary as a generally linear function of the time rate of flow through the nozzles in the spray bar, and the electrical control signal correlative with vehicle speed is arranged to vary generally linearly as a function of speed.

Since the rate of flow of liquid product from the spray bar system is measured as a function of the pressure drop across the spray bar nozzles, the control system is not subject to the inaccuracy of varying slip in the product pump encountered in ground speed control liquid distribution apparatus of the type that measure the speed of the product pump as a measure of rate of flow and, moreover, the control system avoids the necessity of expensive and corrosion sensitive flow meters used in prior ground speed control liquid distributing apparatus having a positive displacement flow meter for measuring the rate of flow of liquid product. Moreover, since the ground speed control liquid distributing apparatus of the present invention measures the flow from the spray bar as a function of the pressure drop across the spray bar, the number of nozzles in the spray bar system can be changed, without changing the spread density maintained by portion of the spray bar that remains active.

These, together with other objects, features and advantages of this invention will be more readily understood by reference to the following detailed description when taken in connection with the accompanying drawings wherein:

FIG. 1 is a diagrammatic illustration of a vehicle mounted liquid distributor apparatus and controls therefore embodying the present invention;

FIG. 2 is a transverse sectional view through the spray bar illustrating one of the spray bar nozzles on an enlarged scale;

FIG. 3 is a fragmentary rear elevational view of the spray bar illustrating one of the spray bar nozzles;

FIG. 6 is a schematic diagram of a modified pressure transducer for use in the control system of the present invention;

FIG. 7a is a composite graph illustrating the relationship between the rate of flow from the spray bar nozzles, the pressure drop across the nozzles, the resistance of the pressure transducer, and the output voltage of the pressure transducer of FIG. 6; and FIG. 7b is a graph illustrating the relationship between the ground speed voltage signal and the speed of the vehicle at different settings.

Figure 4:
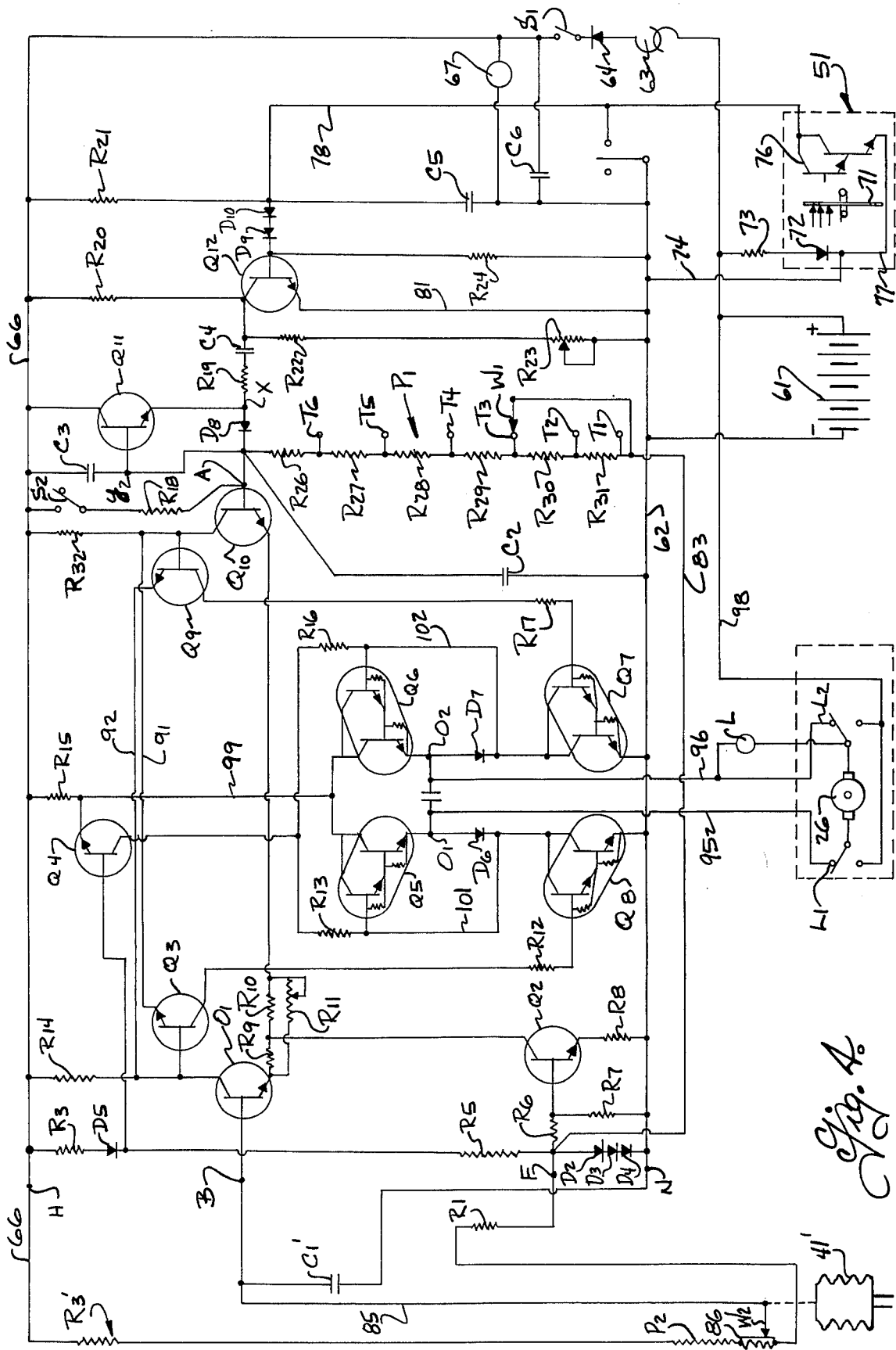
FIG. 4 is a schematic diagram of the electrical control system of the present invention.

The liquid distributor apparatus of the present invention is generally adapted for use on vehicles for spreading liquid products such as liquid fertilizer, liquid insecticides and pesticides, liquid asphalt etc., and herein shown applied to a truck-type vehicle, it being understood that the distributor apparatus could also be applied to trailer-type vehicles. As diagrammatically illustrated in FIG. 1, the vehicle includes front and rear ground engaging wheels 10, 10a and a vehicle drive motor 11 which is drivingly connected through a power train 11a to the rear wheels 10a. The liquid distributor apparatus in general includes a tank 12 mounted on the vehicle for storing a quantity of the liquid product to be distributed, and a spray bar system 14 extending crosswise of the vehicle for spreading liquid product along a preselected width of the spread as the vehicle moves along a path. The pump has its inlet 13a connected, as through an inlet line 15 and strainer 15a, with the tank to receive liquid product therefrom, and an outlet 13b connected through a delivery conduit 16 with the spray bar apparatus 14 to supply liquid product thereto. The pump is conveniently also adapted for use in refilling the tank and, as diagrammatically shown in FIG. 1, a selectively operable valve 17 is provided in the inlet line 15 which can be closed to block communication between the pump inlet and the tank, and an inlet fitting 18 having a selectively operable valve 19 therein communicates with the inlet line 15 between the valve 17 and the pump inlet. The inlet fitting 18 is adapted for connection to a hose leading to a supply of liquid product (not shown) and the valve 17 is closed and the valve 19 opened when it is desired to pump liquid product from the supply source into the tank. The pump outlet 13b also communicates through an outlet conduit 21 and selectively operable valve 22 with the tank, as through a manifold 23. Valve 22 can be selectively opened when it is desired to either refill the tank or when it is desired to recirculate the liquid product in the tank to agitate and mix the same. The manifold 23 preferably extends over a sufficient area of the bottom of the tank to achieve generally uniform agitation and mixing of the material in the tank.

Provision is made for regulating the flow of liquid from the product pump 13 to the spray bar system 14. While the rate of flow of liquid product from the pump to the spray bar system can be regulated by varying the pump speed as disclosed in the aforementioned U.S. Pat. No. 3,782,634, the flow is preferably controlled by a flow control valve 25 in the delivery conduit 16. The pump 13 is preferably of the centrifugal type, of a size and driven at a speed sufficient to deliver liquid product to the spray bar in a quantity and at pressures adequate to meet the maximum anticipated rates of flow from the spray bar system, and the flow control valve 25 is operated as by an electrical responsive actuator 26 to variably throttle the flow through the delivery line 16. As diagrammatically illustrated in FIG. 1, pump 13 is connected as through a drive shaft 28 with the power takeoff 11b of the vehicle engine 11, it being understood that a separate pump drive motor can be provided if desired.

The spray bar system 14 includes an elongated spray bar conveniently formed in sections designated 14a, 14b and 14c, with the outer sections 14b and 14c connected to the central section 14a through swivel couplings 28 which are arranged to allow swinging movement of the outer section to a position at right angles to the central section, for compact storage or transportation or when turning a corner, and the couplings 28 are preferably arranged so as to also function as valves to shut off flow to the outer spray bar sections when they are folded or swung to a position transverse to the central section 14a. As will be understood, the couplings 28 can be arranged so that the outer sections swing horizontally to a folded position or, alternatively, can be arranged so that the outer section swing upwardly to a folded position. The spray bar with foldable end sections and with valves for shutting off the flow to the end sections when folded, are well known and further detailed illustration or description is deemed unnecessary. The spray bar system includes a plurality of fixed orifice type spray nozzles 29 at spaced locations along the spray bar sections. The spray angle of the nozzles, indicated at A in FIG. 1, varies with the rate of flow through the nozzle and is usually a minimum at low pressures and increases somewhat with increasing pressure. The spacing of the spray nozzles along the spray bar is selected in relation to the height of the spray bar above the ground and the spray pattern of the nozzle so that the spray patterns of adjacent nozzles at least intersect at the lower spread rates and overlap somewhat at higher spread rates. The spray nozzles are conveniently of the type shown in FIGS. 2 and 3 and which include a generally horizontally-extending nozzle body 31 having a nozzle orifice 31a arranged to direct a stream of liquid product against the downwardly-extending deflector surface 31b to produce a downwardly directed generally flat fan spray pattern, as shown in FIG. 3. Such nozzles are commercially available and may, for example, be of the type manufactured and sold by Spray Systems Company, 3201 Randolph Street, Bellwood, Ill. In order to minimize dripping of the liquid product from the nozzles when the pressure is shut off, an anti-drip valve 32 is advantageously provided in the flow passage between each spray nozzle on the spray bar, which valve includes a pressure responsive valve member 33 yieldably biased by a spring 34 in a direction opposite the direction of flow from the spray bar to the nozzle, to close and prevent flow from the spray bar to the nozzle when the pressure on the spray bar is reduced to substantially atmospheric pressure.

Fixed orifice spray nozzles can only handle flows in a limited pressure and flow range. When the nozzle pressure is less than about 5 to 10 p.s.i., the liquid product tends to merely run out of the nozzle without producing a satisfactory spray pattern for uniformly distributing the product across the spray width. Conversely, at very high nozzle pressures, the liquid is discharged from the spray nozzles at such a high velocity that problems are encountered with splashing and atomizing of the liquid product as it is discharged from the spray nozzles onto the ground. It is accordingly desirable to limit the dispensing through the spray bar system to a preselected pressure range above 5 to 10 p.s.i. and below around 50 to 60 p.s.i. In order to accommodate flow rates in widely different ranges, different sets of nozzles can be used on the spray bar sections or, alternatively, plural spray bars can be used with valves with selectively communicating the different spray bars with delivery conduit 16.

The rate of flow Q through a set of fixed orifice spray nozzles on a spray bar can be expressed generally by the equation:

(1) $Q = nkA\,P$

When $n$ is the number of fixed orifice nozzles in the spray bar, $k$ is the orifice constant of the spray nozzle, and $P$ is the pressure drop across the orifice. Thus the rate of flow of liquid product from the spray bar system varies as a function of the square root of the pressure and, conversely, the pressure drop across the nozzles varies as a function of the square of the rate of flow of the liquid product through the nozzles. This relationship between the rate of flow of liquid product through the nozzles designated $Q$ and the pressure drop across the nozzles $P$ is graphically shown in FIG. 5a by the curve designated $P = (f)\,Q^2$. In accordance with the present invention, the rate of flow of liquid product from the spray bar system is varied with vehicle speed by sensing the pressure at the spray bar system, sensing the speed of the vehicle over the ground, and operating the flow control valve 25 to regulate the flow of product from the pump to the spray bar system in a manner to vary the pressure in the spray bar system generally as a function of the square of the speed of the vehicle so as to dispense liquid from the spray bar system at a preset spread density which is generally independent of the changes in speed of the vehicle between minimum and maximum vehicle speeds corresponding to the minimum and maximum permissible flow rates through the spray nozzles on the spray bar system at the selected spread density.

A block diagram of the control apparatus for controlling the rate of flow of liquid product from the spray bar system in accordance with ground speed is shown in FIG. 1 and includes a pressure sensor 41 such as a bellows, borden tube or the like in which one side of the pressure responsive member communicates as through a line 42 with the spray bar system so as to respond to the pressure in the spray bar system and with the other side exposed to atmospheric pressure so that the pressure sensor is actuated in response to the pressure differential between the spray bar system and atmosphere, and which pressure differential generally corresponds to the pressure drop across the spray nozzles. The pressure sensor is connected to an analog pressure tranducer 43 for producing an electrical control signal correlative with the pressure of the liquid product in the spray bar system, as sensed by the pressure sensor, and the electrical control signal correlative with pressure is applied to one input B of a differential comparator circuit 44. The control apparatus also includes the vehicle speed sensor 51 for producing a signal correlative with ground speed and, as diagrammatically shown, may conveniently be of the photoelectric type disclosed in the U.S. Patent to Swenson No. 3,550,866. The vehicle speed sensor 51 is connected as through a drive cable 52 to the speedometer cable or to a point in the vehicle transmission that senses the speed of the drive wheels. The ground speed sensor 51 controls a signal shaping circuit 53 that produces an output signal of the pulse or digital type correlative in pulse repetition rate or frequency with the ground speed, and this signal is applied to a digital-to-analog converter 55 that converts the pulse or digital ground speed signal to a voltage signal correlative in amplitude with the speed of the vehicle. The analog signal from the converter 55 is applied through an adjustable range attenuator 56 to the other input terminal A of the differential comparator 44, and differential defrimental comparator compares the ground speed voltage signal applied at point A with the spray bar pressure voltage signal applied at point B and operates a D-C motor output stage 57 to drive the reversible D-C motor actuator 26 of the flow control valve 25 in a direction correlative with the difference between the voltage signals applied to the differential comparator. The ratio to be maintained between the ground speed voltage signals and the spray bar pressure voltage signals is adjustable by the range attenuator 56 to thereby adjust the spread density to be maintained by the spreader apparatus. The control system operates to vary the rate of flow through the control valve 25 to the spray bar system and changes the pressure of the liquid in the spray bar system. Since the pressure drop across the spray nozzles increases as a function of the square of the rate of flow through the nozzles, the control system is arranged so as to vary the pressure in the spray bar system as a function of the square of the speed of the vehicle, to maintain a preset spread density.

An electronic control circuit suitable for the present invention is schematically illustrated in FIG. 4. A D-C power supply source such as the usual twelve volt D-C supply system in a vehicle, diagrammatically indicated by the battery 61 has its negative terminal connected to a conductor 62 hereinafter referred to as the negative bus bar and its positive terminal connected through a fuse 63, diode 64 and on-off switch S-1 to a conductor 66 hereinafter referred to as the positive bus bar. Diode 64 is provided in the circuit to prevent damage to the control circuit in the event the D-C power supply 61 is inadvertently connected into reverse direction, and an indicator lamp 67 is connected between bus bar 66 and 62 to indicate when the control circuit is turned on. A supply filter capacitor C-6 is connected across the power supply to provide a smooth output.

The vehicle speed sensor 51 is conveniently of the photoelectric type disclosed in the U.S. Pat. to Swenson No. 3,550,866 issued Dec. 29, 1970 to which reference is made for a more complete description. In general, the photoelectric sensor includes an apertured disc 71 which is rotated at a speed correlative to ground speed, as by connection to the speedometer cable, and the apertured disc is arranged to interrupt light from a light source to a photosensitive device to turn the photosensitive device on and off. In the embodiment shown, the light source is conveniently in the form of a light-emitting diode 72 which is connected in series with a current biasing resistor 73 through conductor 74 to the negative bus bar 62 and through conductor 66a with the positive side of the power supply. The photosensitive device is conveniently in the form of a phototransistor 76 which is connected through conductors 77 and 74 to the negative bus bar 62 and in a series circuit through conductor 78 and through voltage-dropping diodes D9 and D10 to the base of an npn transistor Q12. A filter capacitor C5 is provided between the input conductor 78 and negative bus bar 62 to filter radio noise picked up by conductor 78. Transistor Q12 forms a part of the signal shaping circuit 53 and has its emiter connected through conductor 81 to the negative bus bar 62 and its collector connected through a load resistor R20 to the positive bus bar 66.

The phototransistor 76 is off or nonconducting when no light passes to the phototransistor and, when the phototransistor is off, transistor Q12 is biased on through resistor R21, diodes D10 and D9, through the base-emitter junction of Q12 and conductor 81 to the negative bus bar 62. When the phototransistor 76 is turned on by the light passing from the light emitting diode 72 through an aperture in the disc 71, the phototransistor saturates or conducts and turns Q12 off. Resistor R24 connected from the base of transistor Q12 to the negative bus bar 62 is provided to bias Q12 off when the phototransistor conducts and diodes D9 and D10 are provided for additional voltage drop to assure shutting off Q12 when the phototransistor is turned on.

The output at the collector Q12 appearing across resistor R22 and calibration resistor R23 is a square wave pulse having a pulse repetition rate equal to the frequency at which the rotary-apertured disc 71 interrupts the light from the light-emitting diode 72 to the phototransistor 73. Since the apertured disc 71 is driven at a speed correlative with ground speed of the vehicle, the pulse repetition rate appearing across resistors R22 and R23 is correlative with ground speed. The digital signal at the collector of Q12 is applied to a digital-to-analog converter that produces an analog output signal correlative in amplitude with the pulse repetition rate. The digital-to-analog converter is preferably of the type which produces an output signal having an amplitude lineraly proportional to the pulse repetition rate and independent of the pulse width. As shown in FIG. 4, the pulse output signal from the collector of Q12 is applied to a circuit including capacitor C4, resistance R19, diode D8 and capacitor C2 to the negative bus bar 62. When a positive going edge of a pulse is applied to the aforementioned circuit, the diode D8 conducts and places capacitors C4 and C2 in series. The capacitor C4 is made much smaller than C2 and most of the voltage appears across capacitor C4. A transistor Q11, of the npn type to produce positive outputs, has its collector connected to the positive bus bar 66, its emitter connected between the diode D8 and the resistor R19 and its base connected between the diode D8 and the capacitor C2. On the negative trailing edge of the pulse, the transistor Q11 conducts and behaves as an emitter follower which maintains the point X at nearly the same potential as the point Y throughout the discharge of the capacitor C4. Thus, on the arrival of the next pulse, the diode D8 has virtually no reverse bias and the whole input voltage is used to charge the capacitors C4 and C2. A voltage divider P' is placed to cross capacitor C2, which voltage divider in the embodiment shown includes a plurality of resistors R26–R31 connected in series with taps T1–T6 between the resistors and a wiper W' movable to engage different taps to function as a step-type potentiometer. The charge which is applied to capacitor C2 is thus discharged at a rate determined by the total resistance of resistors R26–R31 in the circuit and, when the circuit is in equilibrium, the current supplied to C2 must equal the current flowing through the resistors R26–R31. The output voltage appearing at point A is thus proportional to pulse repetition frequency and independent of the pulse width-space ratio of the pulses. Capacitor C3 is connected from the base of the transistor Q11 to the positive bus bar 66. As will be seen, adjustment of the wiper W' of potentiometer P' along taps T1–T6 between resistors R26–R31 varies the effective total resistance across capacitor C2 and accordingly varies the amplitude of the output signal that will be produced at any given pulse repetition rate or vehicle speed.

Figure 5B:
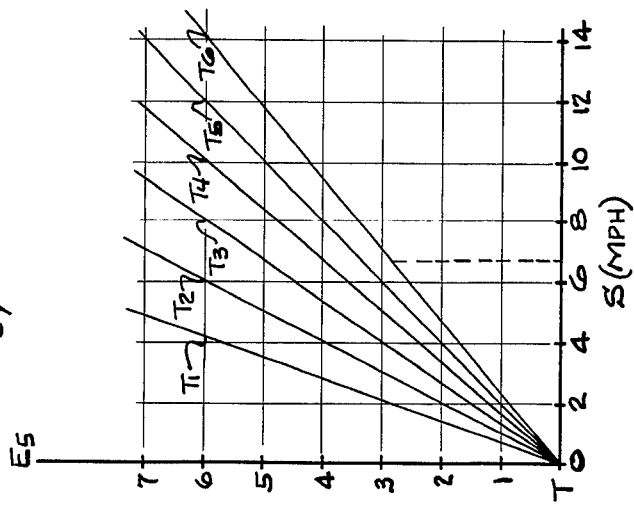
FIG. 5b is a graph illustrating the relationship between the ground speed voltage and the speed of the vehicle, at different density settings.
Figure 5A:
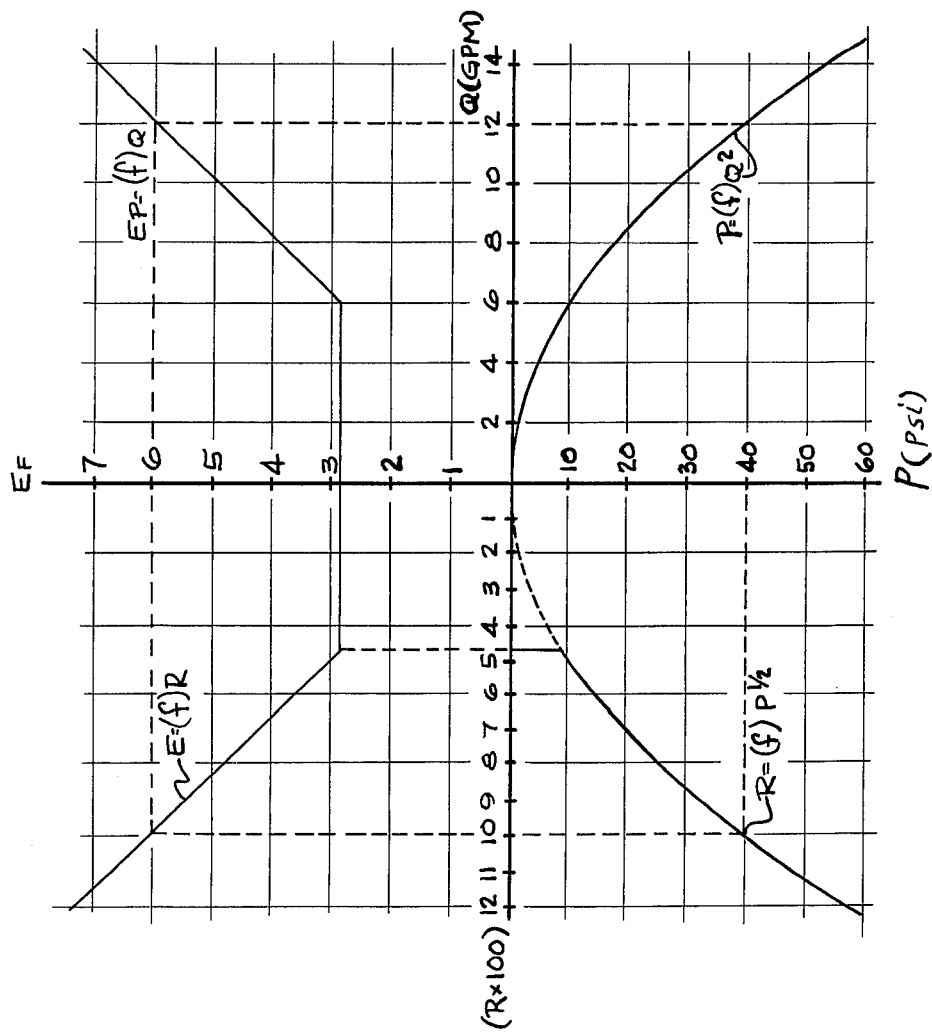
FIG. 5a is a composite graph illustrating the relationship between the rate of flow of liquid from the spray bar nozzles, the pressure drop across the nozzles, the resistance of the pressure transducer, and the output voltage of the pressure transducer for the control system of FIG. 4.

The rate of change of the vehicle speed voltage signal designated $E_s$ appearing at point A with the vehicle speed for different settings T1–T6 of the potentiometer is graphically illustrated in FIGS. 5b and 7b. A biasing circuit including resistor R3, diode D5, resistor R5, and diodes D2, D3 and D4 is connected from the positive bus bar 66 to the negative bus bar 62 and the end the potentiometer P' remote from the point A is connected through a conductor 83 to a point F between the diode D2 and the resistor R5 so that the potentiometer is biased to a fixed level, for example 2.1 volts above the potential of the negative bus bar 62.

The vehicle speed voltage signal $E_s$ appearing at point A is applied to the differential comparator circuit 44 and compared with a voltage signal applied at point B correlative with the pressure in the spray bar system. In the circuit previously described, the analog speed signal $E_s$ varies as a substantially linear function of the speed of the vehicle. However, the pressure in the spray bar system 14 varies generally as a function of the square of the rate of flow of fluid through the spray bar nozzles and provision is accordingly made for producing an electrical analog signal at point B that varies as a generally linear function of the rate of flow through the nozzle. As diagrammatically illustraged in FIG. 4, the pressure-to-voltage transducer comprises a potentiometer P2 having a movable wiper W2 connected to the pressure sensor 41 to be moved thereby. Various different arrangements can be utilized to produce an analog electrical signal at point B that varies generally linearly over a range of pressures with the rate of flow through the nozzles. This can be achieved by using a pressure sensor and analog pressure transducer combination which directly produces an output signal correlative with the square root of the pressure sensed by the sensor, as diagrammatically shown in the circuit of FIG. 4, or by utilizing a pressure sensor an analog pressure transducer combination that produces an output signal correlative with pressure, with a compensating circuit interposed between the analog pressure transducer and the point B leading to the differential comparator, for converting the signal from the pressure transducer to a generally linear function of the rate of flow through the nozzles. As will be understood, the analog pressure transducer 43 can be different types and may, for example, be a variable resistance or potentiometer type as diagrammatically shown in the drawings or it may be a solid state type transducer such as a piezo-resistive sensor.

In the circuit of FIG. 4, a voltage divider including resistor R3, potentiometer P2 and resistor R1 is connected between the positive bus bar 66 and the same point F between resistor R5 and the voltage biasing diodes D2–D4 to which the potentiometer P1 is connected. The wiper W2 of the potentiometer P2 is connected through conductor 85 to point B of the differential comparator and the voltage appearing across resistor R1 and that portion of the potentiometer between resistor R1 and the wiper 42$b$ is therefore compared with the analog speed signal applied to point A. A filter capacitor C1 is connected between input conductor 85 and the negative bus bar 62 to filter radio frequency noise. As graphically shown in FIG. 5$a$ by the curve designated $R = (f) p^{1/2}$, the resistance of the potentiometer p2 is varied as a function of the square root of the pressure sensed by the sensor 41. This can be achieved by using a pressure sensor 41 that has an output motion linearly responsive to pressure and a nonlinear potentiometer 42$a$ whose resistance varies as a function of the square root of the movement of the wiper 42$b$, or by using a linear potentiometer and either a nonlinear pressure sensor 41, or a nonlinear linkage betweeen the pressure sensor and the potentiometer so arranged as to move the wiper W2 and a function of the square root of the pressure sensed by the sensor.

Fixed orifice spray nozzles are generally operative to spray liquid product generally uniformly over a spread pattern in a preselected pressure range, between a lower pressure of the order of 5, 10 p.s.i. and an upper pressure of the order of 50 to 60 p.s.i. Provision is also made for shutting off flow of the spray bar until the vehicle reaches a speed which, at a particular density setting, requires a spray bar pressure in excess of a preselected minimum, for example, in excess of 10 p.s.i. This can be achieved, as diagrammatically shown in FIG. 4, by shorting out that portion of the potentiometer P2 that is contacted by the wiper W2 in the range between 0 and 10 p.s.i., as by a shorting bar or conductor 86, and then adding the resistance R1 in series between the potentiometer P2 and the fixed biased voltage point F of a value substantially equal to the shorted portion of the potentiometer. Thus, as shown by the curve $R = (f) p^{1/2}$, in FIG. 5$a$, the resistance will remain generally constant at the value R1 (about 465 ohms in the graph of FIG. 5$a$) until the pressure sensed by the sensor 41 reaches 10 p.s.i. and thereafter the resistance of the potentiometer will vary as a function of the square root of pressure sensed by the sensor 41. The current flowing through resistor R3, potentiometer P2 and resistor R1 does not change appreciably with movement of the wiper W2 along the potentiometer and the voltage at point B varies generally linearly as a function of resistance in that portion of the voltage divider circuit between the wiper W2 and the point F. Thus, as shown by the curve $E_p = (f) R$ in FIG. 5$a$, the voltage $E_p$ applied to point B will remain substantially constant at a preselected voltage above the potential at point F (about 2.8 volts in the graph of FIG. 5$a$) until the pressure sensor 41 moves the wiper W2 of the potentiometer above the shorting bar 86 at about 10 p.s.i., at which time the voltage appearing at point B varies generally linearly with changes in resistance. Since the resistance of the potentiometer is varied as a function the square root of the pressure at the spray bar, the voltage at point B will vary generally linearly with the rate of flow through the nozzles above 10 p.s.i., as indicated by the curve $E_p = (f) Q$.

A modified circuit for producing an analog electrical signal linearly correlative with the rate of flow through the nozzle as shown in FIG. 6. In this embodiment, the potentiometer P2' has a resistance that varies linearly with the movement of the wiper W2' and the pressure sensor 41 moves the wiper W2' at a rate proportional to the pressure sensed by the sensor.

The input circuit of FIG. 6 can generally be substituted for that portion of the circuit of FIG. 4 appearing to the left of points H, B, F, and N. The input circuit of FIG. 6 includes resistors R3', potentiometer P2' and resistor R1' connected in series from point H on the positive bus bar 66 to the fixed bias point F, with the potentiometer P2' having a wiper W2' to form an adjustable voltage divider. The voltage drop across resistor R1 biases the wiper W2' positive relative to the fixed bias point F by a preselected voltage, indicated at $a$ in the curve $E' W2' = (f) Q^2$ in FIG. 7 (about 1.7 volts on the graph), when the spray bar pressure is zero. As previously described, the resistance of potentiometer P2' varies linearly with movement of the wiper W2' and the pressure sensor 41' moves the wiper W2' at a rate proportional to the pressure at the sensor. Accordingly, the voltage at the wiper W2' varies form the preselected voltage at $a$ generally linearly with the pressure sensed by the sensor and as the square of the rate of flow through the nozzle as shown by the curve $E W2' = (f) Q^2$ in FIG. 7. In order to compensate for the nonlinear relationship between the voltage signal at the wiper W2' and the rate of flow through the nozzle, a compensating circuit is provided to produce a voltage at point B that varies generally linearly with the flow through the nozzle over a range of pressures. In the circuit shown in FIG. 6, resistors R2 and R4 are connected in series with a Zener diode D1, from the wiper W2' of the potentiometer P2' to the negative bus bar 62, and the common point between the resistors R2 and R4 is connected to the differential comparator input point B. The Zener diode D1 acts effectively as an open ciruit until the voltage at point B reaches the reverse breakdown voltage of the Zener diode. In the circuit illustrated, the Zener diode is selected to have a reverse breakdown voltage of about 6 volts so that the Zener diode will conduct when the voltage at point B reaches about 6 volts above the potential at the negative bus bar 62 (about 3.9 volts above the fixed bias F). As shown on the graph of FIG. 7$a$ the voltage at the wiper W2' (measured relative to the potential at point F) is about 1.7 volts when the spray bar pressure is zero, and the voltage at the wiper increases along the curve $E W2' = (f) Q^2$ from 1.7 volts at a about 2.8 volts at $b$ (spray bar pressure 10 p.s.i.) and to about 3.9 volts at $c$ (spray bar pressure 20 p.s.i.). Until the voltage at the wiper rises to 3.9 volts above the potential at point F, the Zener diode D1 does not conduct so that there is substantially no voltage drop across resistor R2 and R4 and the voltage at point B in the circuit therefore corresponds generally to the voltage at the wiper W2' as the spray bar pressure increases from zero to about 20 p.s.i. However, the Zener diode D1 begins conducting when the voltage at the wiper W2' rises about 3.9 volts above the potential at point F and the current flow through the Zener diode increases rapidly for only slight increases in voltage above the reverse breakdown voltage. Thus, the voltage across the Zener diode D1 remains generally constant at its reverse breakdown voltage and current flowing through the Zener diode produces a voltage drop across resistors R2 and R4 sufficient to maintain the voltage across the diode at its breakdown voltage. The common point between resistors R2 and R4 is connected to the differential comparator input point B.

Thus, when the voltage at wiper W2' rises above 3.9 volts above the potential at point F, (6 volts above ground potential at point N), at about 20 p.s.i. in the spray bar, the Zener diode begins conducting and produces a voltage drop across resistor R2 that drops the voltage at point B below the voltage at the wiper W2' such that the voltage at point B increases at a lower rate than the voltage at wiper W2' with increasing spray bar pressure, as shown by the broken line curve designated $EB = f(Q)$. The resistors R2 and R4 are proportioned such that the slope of the curve $E_b = (f) Q$ from $c$ to $d'$ is approximately the same as the slope from $b$ to $c$. It has been found that the voltage at point B can be made to vary generally linearly with flow through the spray bar nozzles from the spray bar pressure of about 10 p.s.i. to about 50 p.s.i. if R1 is about 255 ohms; P2' 1,000 ohms; R3 400 ohms; R2 1k ohms, R4 is 4.53 k ohms, and Zener diode D1 has a reverse breakdown voltage of 6 volts.

The differential comparator circuit 44 includes transistors Q1 and Q10 connected to form a differential amplifier and transistors Q3 and Q9 connected to form a cross-coupled amplifier. Transistors Q1 and Q10 are npn type transistors having their bases respectively connected to point B and point A. Transistor Q1 has its collector connected through resistor R14 to the positive bus bar 66 and transistor Q10 has its collector connected through resistor R32 to the positive bus bar 66. The emitters of transistors Q1 and Q10 are respectively connected through resistors R9 and R10 to the collector of the transistor Q2. The resistors R9 and R10 provide series negative feed back for the differential amplifier and a gain adjusting potentiometer R11 is connected across the resistors R9 and R10 with a movable wiper to enable adjustment of the gain of the differential amplifier. Transistor Q2 is an npn type transistor connected to provide a constant current source for the differential amplifier transistor Q1 and Q10 and transistor Q2 has its emitter connected through resistor R8 to the negative bus bar 62 and its base connected to a voltage divider including resistors R6 and R7 connected across the diodes D2–D4. The diodes D2–D4 provide a fixed operating voltage to operate Q2 at a fixed current. The collectors of transistors Q1 and Q10 are respectively connected to the bases of npn type transistors Q3 and Q9, and the emitter of transistor Q3 is cross-coupled through conductor 91 to the collector of Q10 and, similarly, the emitter Q9 is cross-coupled through conductor 92 to the collector of Q1. The D-C motor output state 57 includes four Darlington pair transistors Q5, Q6, Q7 and Q8 arranged in a bridge type circuit having output terminals O1 and O2 connected through conductors 95 and 96 to the reversible D-C motor actuator 26 for the flow control valve. Limit switches L1 and L2 are interposed between the reversible motor 26 and the conductors 95, 96 and, as shown, the limit switches L1 and L2 are single pole double throw switches movable from a position connecting the motor to conductors 95 and 96 to a position connecting the motor to a conductor 98 connected to the positive terminal of the power supply.

The collectors of the Darlington pair transistors Q5 and Q8 are connected through conductor 99 and resistor R15 with the positive bus bar 66 and the emitters of these transistors are connected to the output terminals O1 and O2 and through diodes D6 and D7 respectively to the collectors of transistors Q6 and Q7, the emitters of which transistors are connected to the negative bus bar 62. The collectors of the cross-coupled amplifiers Q3 and Q9 are respectively connected through resistors R12 and R17 to the base of the transistors Q6 and Q7, and the bases of transistors Q5 and Q8 are connected respectively through resistors R13 and R16 to the collector of a transistor Q4 arranged to function as an automatic current limiting device. The bases of transistors Q5 and Q8 are also connected through conductors 101 and 102 respectively to the collectors of transistors Q6 and Q7. Transistor Q4 has its emitter connected to a point between the resistor R15 and the collectors of transistors Q5 and Q8 and its base connected through conductor 104 to a point on the voltage divider circuit between diode D5 and resistor R5. A lamp L2 is connected between conductor 96 and switch L2 to indicate when the valve is at its fully open position.

With the above described circuit, whenever the voltage at point B exceeds the voltage at point A, transistor Q1 will be turned on and this increases the voltage drop across resistor R14. When this occurs, the voltage drop across R32 decreases and this turns Q3 on and Q3 through resistance R12, turns Q8 on. When Q8 is turned on, it effectively shorts the negative bus bar 62 and this, through conductor 101 and R13, turns Q5 off. Simultaneously, the decrease in voltage across R32 turns Q9 off and this, in turn, turns Q7 off. When Q7 is off, transistor Q6 is biased to conduction through resistor R16 and is turned on. Current then flows from the positive bus bar through transistor Q6, output terminal O2, conductor 96, limit switch L2 and in one direction through the motor 26 then through limit switch L1 and conductor 95 to output terminal O1 and then through D6 diode and transistor Q8 to a negative terminal to operate the motor in a direction to close the valve. When the signal at point A is above the signal at point B, transistors Q7 and Q5 are turned on and transistors Q8 and Q6 are turned off so that current flows in the opposite direction through the motor actuator 26 to open the valve. The limit switches L1 and L2 operate to stop the motor when the valve respectively reaches its fully closed and fully opened position. As shown in FIG. 4, a circuit including resistor R18 and a switch S2 connected between point A and the positive terminal and the value of the resistor is selected to inject a fixed input to the differential amplifier which is greater than the voltage drop across the resistance R3 in the transistor input circuit so that the valve will open. This allows selective opening of the valve when desired for flushing out the system etc. R3 is selected to give 15 p.s.i. spray bar operating pressure on setting No. 15.

On the foregoing it is felt that the construction and operation of the fluid distributor apparatus will be readily understood. The ground speed sensor 51 produces a pulse type output signal having a frequency correlative with ground speed and this signal is applied to a signal shaping circuit 53 and digital-to-analog convertor 55 and range attenuator 56 to one input terminal A of the differential amplifier 44. This signal applied to the input terminal A varies generally linearly with the speed of the vehicle and the amplitude of the signal with speed can be selectively varied by the range attenuator 56. The pressure sensor 41 senses the pressure in the spray bar and operates an analog pressure transducer which either directly or through a compensating circuit applies an analog signal to the other input terminal B of the differential comparator, which analog signal varies over a range of pressures as a function of the square root of the pressure drop and hence as a generally linear function of the rate of flow through the spray bar nozzles. In order to prevent opening of the valve and passage of fluid to the spray bar at speeds below that at which the spray bar nozzles can effect a generally uniform distribution of the material, the analog pressure transducer and the circuit for applying the electrical signal to the point B of the differential comparator is arranged to bias point B above the point A until the vehicle reaches a speed at which satisfactory spraying can occur. As will be seen from the graphs of FIGS. 5a and 5b, at the range setting T6, the voltage output $E_s$ of the speed sensor would not equal the minimum voltage applied at point B until between 6 to 7 mph. This is the vehicle speed at which the spray bar pressure required for spreading at density setting T6, would be about 10 p.s.i. at range setting T1, the minimum vehicle speed required for spreading at spray bar pressures about 10 p.s.i. is slightly less than 2 miles per hour.

The embodiments of the invention in which an exclusive property or privilege is claimed are defined as follows:

1. In a liquid distributor apparatus for use in a vehicle to distribute liquid product along a path traversed by the vehicle at a time rate of flow generally proportional to vehicle speed to maintain a preset spread density, the distributor apparatus including a tank for carrying a quantity of liquid product, product pump means having an inlet connected to receive product from the tank and an outlet connected to a delivery conduit means for delivering liquid product under pressure thereto, spray bar means connected to receive liquid product from the delivery conduit means and having nozzle means operative over a range of pressures to spray liquid product generally uniformly across a preselected width of spread at a time rate of flow that varies generally as a function of the square root of the pressure drop across the nozzle means, pressure sensing means for sensing the pressure on the liquid product in said spray bar means, pressure signal means responsive to said pressure sensing means and operative over a range of pressures for producing a first electrical control signal correlative with the pressure on the liquid product in said spray bar means, vehicle speed sensing means for producing a second electrical control signal correlative with the speed of the vehicle, and control means responsive to said first and second electrical control signals for controlling the rate of flow of liquid product to said spray bar means to vary the pressure on the product in said spray bar means generally as a function of the square of the speed of the vehicle and thereby maintain a preset spread density.

2. In a fluid distributor apparatus according to claim 1 wherein said control means includes a flow control valve in the delivery conduit means for controlling flow of liquid product to the spray bar means, and electroresponsive means for moving said flow control valve between open and closed positions.

3. In a liquid distributor apparatus according to claim 2 wherein said control means includes means operative to prevent opening of the flow control valve at low vehicle speeds.

4. In a liquid distributor apparatus according to claim 2 wherein said control means includes means operative to prevent opening of the flow control valve at low vehicle speeds in which the spray bar pressures required for distributing fluid product at said preset spread density are below a preselected minimum pressure.

5. In a liquid distributor apparatus according to claim 1 wherein said pressure signal means includes means operative to vary said first electrical control signal as a generally linear function of the rate of flow through said nozzle means.

6. In a liquid distributor apparatus according to claim 1 wherein said pressure signal means includes means operative to vary said first electrical control signal as a function of the square root of the pressure sensed by said pressure sensing means.

7. In a liquid distributor apparatus for use on a vehicle to distribute liquid product along a path traversed by the vehicle at a time rate of flow generally proportional to vehicle speed to maintain a preset spread density, the distributor apparatus including a tank for carrying a quantity of liquid product, product pump means having an inlet connected to receive product from the tank and an outlet connected to a delivery conduit means, spray bar means connected to receive liquid product from the delivery conduit means and having nozzle means spaced therealong operative over a range of pressure to spray liquid product generally uniformly along a preselected width of spread at a time rate of flow that varies as a nonlinear function of the pressure drop across the nozzle means, means for sensing the pressure on the product in the spray bar means, pressure signal means responsive to said pressure sensing means and operative over a range of pressures for producing a first electrical control signal that varies as a generally linear function of the time rate of flow through the nozzle means, vehicle speed sensing means for producing a second electrical control signal that varies as a generally linear function of the speed of the vehicle over the ground, and control means responsive to said first and second electrical control signals for controlling the rate of flow of liquid product to said spary bar means to vary the pressure on the product in the spray bar means and maintain a preset ratio between said first and second electrical control signals.

8. In a liquid distributor apparatus according to claim 7 including means for varying the preset ratio to be maintained between said first and second electrical control signals.

9. In a liquid distributor apparatus according to claim 7 wherein the rate of flow of fluid product through the nozzle means varies as a function of the square root of the pressure drop across the nozzle means, said pressure signal means including means operative to vary said first electrical control signal as a function of the square root of the pressure sensed by said pressure sensing means.

10. A liquid distributor apparatus according to claim 7 wherein said spray bar means includes plural spray bar sections, and means for shutting off flow to at least one spray bar section while maintaining flow to another spray bar section.

11. A liquid spreader control system for a vehicle mounted liquid distributor apparatus of the type including a tank for carrying liquid product, a spray bar apparatus having fixed orifice nozzles spaced therealong for spreading liquid product, and pump means for delivering liquid product from the tank to the spray bar apparatus under pressure, said control system including pressure sensing means for sensing the pressure on the liquid product in the spray bar apparatus, pressure signal transducer means responsive to said pressure sensing means and operative over a range of pressures for producing a first electrical control signal correlative with the pressure sensed by said sensing means, vehicle speed sensing means for producing a second electrical control signal correlative with the speed of the vehicle, and control means responsive to said first and second electrical control signals for controlling the rate of flow of liquid product to said spray bar apparatus to vary the pressure on the product in the spray bar apparatus generally as a function of the square of the speed of the vehicle to maintain a preset spread density at varying vehicle speeds.

12. A liquid spreader control system according to claim 11 wherein said control means includes a flow control valve for controlling flow of liquid product from the pump means to the spray bar apparatus, and electroresponsive means for moving said flow control valve between open and closed positions to control the pressure on the liquid product in the spray bar apparatus.

13. A liquid spreader control apparatus according to claim 12 including means operative to prevent opening of the flow control valve at low vehicle speeds.

14. A liquid spreader control apparatus according to claim 12 including means operative to prevent opening of the flow control valve at low vehicle speeds at which the spray bar pressure required for distributing liquid product at said preset spread density are below a preselected minimum pressure.

15. A liquid spreader control system for a vehicle mounted liquid distributor apparatus of the type including a tank for carrying a liquid product, a spray bar apparatus having fixed orifice nozzles spaced therealong for spreading liquid product, and pump means for delivering liquid product from the tank to the spray bar apparatus under pressure, said control system including pressure sensing means for sensing the pressure on the liquid product in the spray bar apparatus, the pressure on the liquid product in the spray bar means varying generally as a function of the square of the rate of flow of product through the nozzles, pressure signal transducer means responsive to said pressure sensing means and operative over a range of pressures for producing a first electrical control signal that varies as a function of the square root of the pressure and as a generally linear function of the time rate of flow through the fixed orifice nozzle, vehicle speed sensing means for producing a second electrical control signal that varies as a generally linear function of the speed of the vehicle over the ground, and control means responsive to said first and second electrical control signals for controlling the rate of flow of liquid product to said spray bar apparatus to vary the pressure on the product in the spray bar apparatus and maintain a preset rate between said first and second electrical control signals.

16. A control system according to claim 15 including means for varying the preset rate to be maintained between said first and second electrical control signal.

17. A control system according to claim 15 wherein said pressure transducer includes a nonlinear impedance device operated by said pressure sensor.

18. A control system according to claim 15 wherein said pressure transducer includes a first means for producing a voltage signal that varies as a generally linear function of the pressure sensed by the sensing means over a preselected pressure range, and means responsive to said voltage signal for producing said first electrical control signal.

* * * * *